United States Patent [19]

Wickel et al.

[11] Patent Number: 4,845,060
[45] Date of Patent: Jul. 4, 1989

[54] SINTERABLE $Si_3N_4$ POWDER AND A PROCESS FOR ITS PREPARATION

[75] Inventors: Ulrike Wickel; Gerhard Franz; Benno Laubach, all of Krefeld, Fed. Rep. of Germany

[73] Assignee: Bayer Aktiengesellschaft, Leverkusen, Fed. Rep. of Germany

[21] Appl. No.: 54,029

[22] Filed: May 22, 1987

[30] Foreign Application Priority Data

May 24, 1986 [DE] Fed. Rep. of Germany ....... 3617489

[51] Int. Cl.$^4$ .............................................. C04B 35/58
[52] U.S. Cl. ........................................ 501/97; 501/98; 423/406
[58] Field of Search ...................... 501/97, 98; 241/39; 423/406, 409

[56] References Cited

U.S. PATENT DOCUMENTS 4,124,402  11/1978  Greskovich et al. ................ 501/92
4,602,743  7/1986  Nied ..................................... 241/39
4,643,859  2/1987  Mitomo et al. ...................... 501/97

FOREIGN PATENT DOCUMENTS 54-107913  8/1979  Japan ................................. 501/97
57-156378  9/1982  Japan ................................. 501/97

OTHER PUBLICATIONS

*Science of Ceramic Chemical Processing,* ed. by Hench and Ulrich, Wiley, New York, 1986, p. 539 ff.

*Primary Examiner*—William R. Dixon, Jr.
*Assistant Examiner*—Anthony J. Green
*Attorney, Agent, or Firm*—Connolly and Hutz

[57] ABSTRACT

Sinterable $Si_3N_4$ powder having an average particle size of less than 1 μm, wherein no individual particle has a diameter greater than 100 μm, the total content of metallic impurities of the powder is less than 1000 ppm and the iron content is less than 200 ppm is produced by grinding agglomerated $Si_3N_4$ in a spiral jet mill.

7 Claims, 1 Drawing Sheet

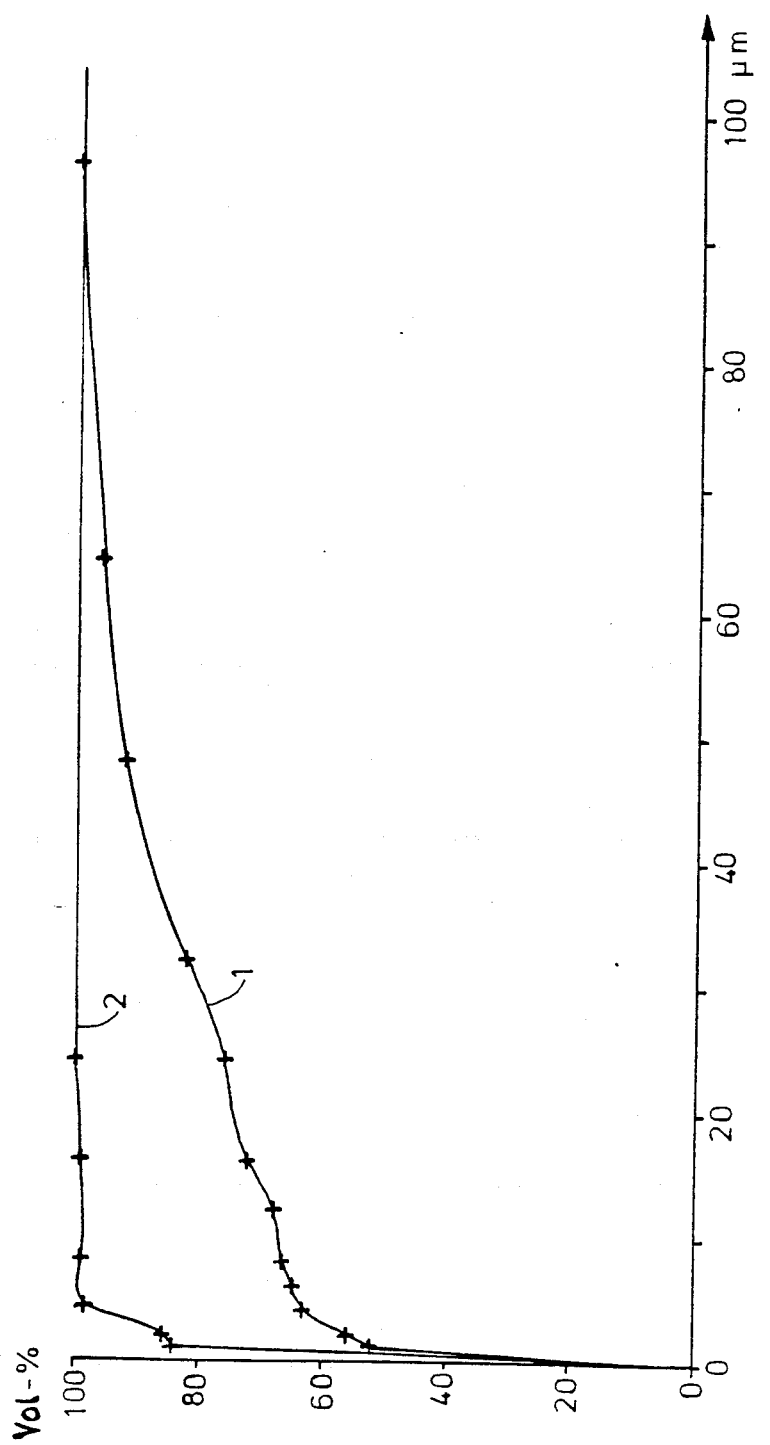

SINTERABLE $Si_3N_4$ POWDER AND A PROCESS FOR ITS PREPARATION

This invention relates to a new sinterable $Si_3N_4$ powder in which the particles have an average particle size of less than 1 μm and to a process for the preparation of such $Si_3N_4$ powder.

BACKGROUND OF THE INVENTION

The major factors which determine whether a $Si_3N_4$ powder can be sintered are not only its purity, the proportion of α-$Si_3N_4$ phase present in the powder and the particle form of the powder but also especially the particle size.

Powders having a BET surface area (nitrogen method) greater than 10 $m^2$/g are regarded as suitable for sintering. The average particle size of the agglomerates in these powders should be less than 1 μm.

It is also known that hard agglomerates have an extremely adverse effect on the sintering process. Powders in which the agglomerates are hard but not dense can only be compressed to low green densities. This results in severe, uncontrollable shrinkage in the manufacture of the ceramic component as well as prolonged sintering times and hence the risk of the development of coarse grains. In addition, the coarse structures present in the green product can no longer be eliminated in the course of the sintering process and the strength properties are therefore seriously impaired.

In the known manufacturing processes employed industrially, $Si_3N_4$ powders are obtained in an agglomerated form. The average size of the agglomerates, which may be determined, for example, by laser diffraction methods, is generally in the region of 1 to 10 μm. Before sintering is carried out, the agglomerates of these $Si_3N_4$ powders must be broken down to an average particle size of less than 1 μm.

Various processes of wet grinding (attrition milling, ball milling, etc) have been recommended for breaking down the agglomerates of $Si_3N_4$ powders but these methods are only useful to a limited extent. Although the agglomerates can be broken down, it is not possible to prevent abrasion of the grinding bodies, and consequently the $Si_3N_4$ powders become contaminated with the grinding dust. When ceramic grinding bodies (e.g. $Al_2O_3$, $ZrO_2$) were used, the powders were found to contain large grains in the form of splinters probably consisting of material which had broken away from the grinding balls. Although contamination by a foreign substance could be prevented by using grinding balls consisting of $Si_3N_4$, the grinding section of $Si_3N_4$ balls is relatively weak so that the grinding times are very prolonged, amounting to several hours, and the costs of the process are therefore high.

Apart from the above mentioned harmful effects on the $Si_3N_4$ powders, the re-agglomeration which takes place in the course of drying is regarded as a general disadvantage of wet grinding. Dry agglomerates may seriously impair the capacity of ground powder to undergo sintering.

It has also been proposed (Alpine Aktuell No. 26, Alpine/Augsburg) to disagglomerate $Si_3N_4$ by grinding in a counter-jet mill. The $Si_3N_4$ powders are to be disagglomerated to such a degree in a fluidized bed counter-jet mill that a residue of 1% is left after the material has been passed through a 10 μm sieve. Fluidized bed counter-jet mills, however, have a moving sifter which is subject to considerable wear due to the high abrasiveness of the silicon nitride powder. When grinding tests are carried out on $Si_3N_4$ powder having an initial iron content of less than 100 ppm, the iron content is found to be increased after the test to 500 ppm which amounts to an unacceptable degree of contamination for a good quality $Si_3N_4$ powder.

It is further stated in Sprechsaal 118 (6), 525–528 (1985) that $Si_3N_4$ may be ground in counter-jet mills with an integrated sifter and the abrasion on the sifter can be prevented. According to the examples given, however, the desired degree of fineness corresponding to an average particle size of less than 1 μm cannot be achieved. Even when less hard materials are ground in these mills, e.g. lead glass, the $d_{50}$ value obtained after 6 passages through the mill is still 1.5 μm. It is also known from the literature that it was virtually impossible to alter the dispersivity of commercial $Si_3N_4$ powders by air jet grinding (Dissertation G. Wötting, Berlin 1983).

In our copending application Ser. No. 53,957, filed May 22, 1987, we disclose and claim sinterable $Si_3N_4$ powders containing sintering additives and a process for their preparation.

It is an object of the present invention to provide a $Si_3N_4$ powder which can readily be sintered and which does not have the disadvantage of powders prepared by the known processes.

BRIEF DESCRIPTION OF THE INVENTION

It has now surprisingly been found that these requirements are fulfilled by $Si_3N_4$ powders which do not contain any particles having a diameter greater than 100 μm and which are comparatively free from metallic impurities.

The $Si_3N_4$ powders of the present invention are produced by grinding agglomerated $Si_3N_4$ in a spiral jet mill.

DETAILED DESCRIPTION OF THE INVENTION

The present invention thus relates to a sinterable $Si_3N_4$ powder in which the agglomerates have an average particle size of less than 1 μm and which contains no particles having a diameter greater than 100 μm and in which the total content in metallic impurities is less than 1000 ppm and in particular the iron content is less than 200 ppm.

A $Si_3N_4$ powder according to the invention in which the total content in metallic impurities is less than 200 ppm is particularly preferred. This may be prepared particularly advantageously from a $Si_3N_4$ starting powder which has been obtained by the reaction of $SiCl_4$ with $NH_3$.

The $Si_3N_4$ powders according to the invention have excellent sintering characteristics and the ceramic parts obtained from them have a very high mechanical strength. Although the powders known from the state of the art generally fulfill the requirement for having an average particle size of less than 1 μm, they do not have comparably advantageous properties.

It is evident from investigations carried out on commercial powders that in the powders known in the art no great significance was attached to their freedom or otherwise from oversized particles.

When only a small number of oversized grains are present in a powder, they cannot be detected by laser diffraction methods, sedimentation analyses or similar conventional methods of determining the particle size distribution.

When a Hegman grindometer is used, however, it is possible to detect even a small number of oversized grains in the powder. The assessment of graininess of pigments by means of a grindometer has been described in German Industrial Standard ("DIN") 53,203. Although there is no corresponding standard for ceramic powders, the method described in DIN 53,203 may be used equally well for ceramic materials, in particular for determining the size and quantity of oversized grains. Grindometer measurements carried out on commercial powders show that even though some of these powders have particle diameters of less than 1 μm, they still contain a disturbing proportion of oversized particles greater than 100 μm and in some cases even greater than 250 μm.

It has been found that spiral jet milling is suitable for the disagglomeration of $Si_3N_4$ powder to an average particle size of less than 1 μm.

The present invention thus relates to a process for the preparation of the $Si_3N_4$ powder according to the invention, characterised in that agglomerated $Si_3N_4$ powder is ground in a spiral jet mill. Spiral jet mills are devices which are well-known in the grinding art. The material to be ground is entrained in a fluid jet which is injected at suitable angle into a chamber wherein a spiral vortex is produced. Collision of the particles causes the entrained solid material to be reduced in particle size. The powder of a suitable small size is removed and unbroken particles remain in the spiral vortex until reduced to a suitable size. Spiral jet mills of this type are illustrated and their operation more fully explained in the following publications: H. Kürten, H. Rumpf, Chemie-Ing.-Techn. 38, 1187 (1966) and W. Schäfer, K. Sommer, Reprints of 1. World Congress on Particle Technology, Part II, S. 325, ed. by K. Leschonski, publ. NMA, Messezentrum, 8500 Nurnberg 50.

It is found against all expectation that the powders are largely free from oversized grains, as can be demonstrated by means of a grindometer. To eliminate the risk of metallic impurities, the interior of the grinding chamber, the pipes, the product feed nozzle and other surfaces with which the $Si_3N_4$ powder comes into contact may be lined with a plastics or ceramic material or manufactured from such a material. The highly abrasion resistant synthetic material Vulkollan and wear resistant ceramic materials $B_4C$, $Al_2O_3$, SiC and $Si_3N_4$ have proved, among others, to be suitable for this purpose.

Once ground down, the powder should also be kept free from contact with materials which would impart impurities. The ground powder is, therefore, preferably deposited on a filter bag of needled felt, plastics fabric or plastics coated fabric.

Since the breaking down of agglomerates which have developed gives rise to new surfaces, it is advantageous to use nitrogen or argon as a grinding gas in order to prevent contamination with oxygen. For grinding only slightly agglomerated powder which hardly undergoes any increase in the BET during grinding, however, air is adequate as a grinding gas. As regards the cost/output ratio, it has generally been found most advantageous to employ a grinding gas pressure in the range of from 4 to 6 bar, depending on the hardness of the agglomerates of the starting material.

If the starting material is fed in at a uniform rate and a large nozzle angle is employed (above 30°) and a grinding gas pressure of from 2 to 10 bar is employed, then even large, hard agglomerates can be broken down in the powders according to the invention.

BRIEF DESCRIPTION OF THE DRAWING

The FIGURE illustrates graphically the particle size distribution of starting material and of material according to the present invention.

In the following example, the invention is illustrated by way of example but not limited thereby.

EXAMPLE $Si_3N_4$ powder having a total metal content as impurities of about 700 ppm, especially an iron content of about 100 ppm, an average particle diameter determined by laser diffraction of $d_{50}=1$ μm and a maximum grain diameter determined by a Hegman grindometer of 200 μm was ground in a spiral jet mill. The grinding pressure was 2 bar and the output about 120 g/h and the grinding gas used was compressed air. The interior of the grinding chamber was lined with Vulkollan. The finished product was deposited on a filter bag of dralon fabric.

The ground powder was found to have an iron content of 120 ppm. The average particle diameter after grinding was about 0.5 μm and the maximum particle size as determined with a Hegman grindometer was 80 μm. The particle size distributions plotted in the FIGURE clearly show the disagglomeration of starting powder 1 into product powder 2 achieved by the grinding process. In this figure, the particle sized in diameters are entered along the abscissa and the volumes percent along the ordinate, for starting material 1 and product powder 2.

What is claimed is:

1. A process for producing sinterable $Si_3N_4$ powder having an average particle size of less than 1 μm, the total content of metallic impurities of the powder is less than 1000 ppm and the iron content is less than 200 ppm which consists essentially of grinding agglomerated $Si_3N_4$ containing less than 1000 ppm metallic impurities in a spiral jet mill.

2. A process according to claim 1 wherein after grinding the ground powder is deposited on a filter bag of needled felt, plastic fabric or plastic-coated fabric.

3. A process according to claim 1 which comprises grinding in the presence of air, nitrogen or argon gas.

4. A process according to claim 3 wherein the gas pressure is from 2 to 10 bar.

5. A process according to claim 1 wherein the parts of the spiral jet mill contacting $Si_3N_4$ are fabricated from a non-metallic material.

6. A process according to claim 5 wherein the non-metallic material is a synthetic or a ceramic material.

7. A process according to claim 5 wherein the non-metallic material is a ceramic material chosen from the group consisting of $B_4C$, $Al_2O_3$, SiC, $Si_3N_4$ and mixtures thereof.

* * * * *